United States Patent
Neate et al.

(10) Patent No.: US 12,340,248 B2
(45) Date of Patent: Jun. 24, 2025

(54) INTELLIGENT DYNAMIC SCALING BASED ON INTERNAL AND EXTERNAL INDICATORS

(71) Applicant: MICROSOFT TECHNOLOGY LICENSING, LLC, Redmond, WA (US)

(72) Inventors: Nicolas Harry Neate, Reading (GB); Murray William Rogers, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 508 days.

(21) Appl. No.: 17/733,955

(22) Filed: Apr. 29, 2022

(65) Prior Publication Data

US 2023/0350717 A1     Nov. 2, 2023

(51) Int. Cl.
 *G06F 3/00* (2006.01)
 *G06F 9/50* (2006.01)
(52) U.S. Cl.
 CPC ................. *G06F 9/5027* (2013.01)
(58) Field of Classification Search
 CPC ....................................................... G06F 9/50
 See application file for complete search history.

(56) References Cited

U.S. PATENT DOCUMENTS

| | | | |
|---|---|---|---|
| 10,452,441 B1 * | 10/2019 | Subramanian | G06N 20/20 |
| 10,826,931 B1 * | 11/2020 | Quan | H04L 63/1441 |
| 10,937,036 B2 * | 3/2021 | Wasser | G06Q 10/02 |
| 11,249,790 B1 * | 2/2022 | Gupta | G06F 9/5077 |
| 2010/0057967 A1 * | 3/2010 | Murakami | G06F 13/24 |
| | | | 710/267 |
| 2018/0139100 A1 * | 5/2018 | Nagpal | H04L 41/122 |
| 2018/0225137 A1 * | 8/2018 | Bianchini | G06F 9/5005 |
| 2020/0019841 A1 * | 1/2020 | Shaabana | G06N 3/08 |
| 2020/0104189 A1 | 4/2020 | Gopalan et al. | |
| 2021/0117308 A1 * | 4/2021 | Burgos | G06N 20/00 |
| 2021/0234756 A1 * | 7/2021 | Fong | H04L 41/0896 |
| 2021/0243190 A1 * | 8/2021 | Bargury | G06F 21/6218 |

(Continued)

FOREIGN PATENT DOCUMENTS

JP        2007157131 A    *   6/2007    .........  G06F 12/0253

OTHER PUBLICATIONS

Eli Cortez, Resource Central: Understanding and Predicting Workloads for Improved Resource Management in Large Cloud Platforms. (Year: 2017).*

(Continued)

*Primary Examiner* — Lechi Truong
(74) *Attorney, Agent, or Firm* — Han Gim; Newport IP, LLC (57) ABSTRACT

Techniques are disclosed for allocating computing resources in a computing network of a cloud computing system, the computing resources comprising a plurality of computing devices hosting virtual machines. An expected usage profile is determined based on first data indicative of a current demand for computing resource usage in the computing network, second data indicative of an adjacent demand for computing resource usage in the computing network, third data indicative of a historical demand for computing resource usage in the computing network, and fourth data indicative of events that are external to the computing network.

14 Claims, 7 Drawing Sheets

(56) References Cited

U.S. PATENT DOCUMENTS

| | | | | |
|---|---|---|---|---|
| 2021/0365350 A1* | 11/2021 | Fujita | ............... | G06F 9/5027 |
| 2022/0245001 A1* | 8/2022 | Virdi | ............... | G06F 9/5077 |
| 2022/0327002 A1* | 10/2022 | Yang | ............... | G06F 9/5038 |
| 2023/0305525 A1* | 9/2023 | Luke | ............... | B41J 2/17566 |
| 2023/0401103 A1* | 12/2023 | Ram | ............... | G06F 11/3442 |

OTHER PUBLICATIONS

Minal Patel, Machine Learning Based Statistical Prediction Model for Improving Performance of Live Virtual Machine Migration. (Year: 2016).*

"International Search Report and Written Opinion Issued in PCT Application No. PCT/US2023/012856", Mailed Date: May 19, 2023, 15 Pages.

* cited by examiner

INTELLIGENT DYNAMIC SCALING BASED ON INTERNAL AND EXTERNAL INDICATORS

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines (VM) that appear and operate as independent computer devices to a connected user or containers that provide various functions. The data center can create, maintain or delete virtual machines in a dynamic manner.

When data center resources are inefficiently allocated and configured, poor network performance may result, resulting in lost data, or users being unable to provide quality services to their downstream customers, which may result in lost revenue, customer dissatisfaction, and potentially unsafe situations. Overallocation of resources, on the other hand, can lead to cost inefficiencies. It is with respect to these considerations and others that the disclosure made herein is presented.

SUMMARY

Cloud services typically scale up resources in order to meet increasing workload demands. The scaling criteria that are used to determine when to scale up are typically a measure of the current demand on cloud services, for example CPU usage, memory usage, or request rate. However, making a scaling decision based on such measures may not provide sufficient time for the cloud service provider to allocate the necessary resources and start up the resources in time to meet the increased demand. Accordingly, there might be a period of time during which demand will outpace the available resources. Additionally, one common technique is to add headroom into the system (i.e., defend against the scaling time by scaling out "early." If the cloud service provider allocates more resources than are necessary, the cloud service provider may inefficiently utilize resources or pull resources from services that need the resources. This can lead to inefficient utilization of the cloud service provider's resources and cause increased cost or wasted resources.

The present disclosure describes systems and techniques for augmenting typical measurement data used to determine cloud computing demand. Augmentation techniques may include various internal and external data as well as an intelligent scaling algorithm that is more efficient in its allocation of cloud resources while allowing for timely and predictive response to changes in demand. In response, the cloud service provider may scale up and down its allocated resources without shedding workload or inefficiently allocating resources. In one embodiment, a learning algorithm may be implemented that combines inputs from multiple sources to make scaling decisions rather than a simple threshold based on a single type of source.

In an embodiment, data from two or more of the following sources may be used to make a resource scaling decision:
Current demand on the service (for example CPU, memory, or request rate);
Availability of other service instances (for example, loss of connectivity to a service instance in a remote region may suggest that a higher load is expected for the service instance in the local region);
Historical trends that consider factors including time of day, day of week, holidays, seasons, and time zones;
Current usage data for other external services (for example, an unexpected spike in messages or breaking news alerts can predict an imminent spike in demand for a voicemail service).

By more accurately predicting workloads, a more efficient arrangement of resources such as virtual machines or containers may be realized. Based on the predicted workloads, potential overload issues may be auto-remediated by allocating resources as needed. Once a prediction is generated and a predetermined threshold is reached, the cloud service provide can take proactive action.

The described techniques can allow for maintaining efficient use of computing resources such as processor cycles, memory, network bandwidth, and power, while reducing potential loss of data and services and downtime, resulting in impact to end users.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The disclosed embodiments describe technologies for predictively allocating computing resources based on multiple internal and external parameters. The described techniques may allow data centers to more effectively adhere to operational objectives and at the same time improve operating efficiencies. In many data centers, issues such as exhaustion of available network bandwidth or processing capability may cause delays or drops of data. Such issues can have a negative impact on performance and the user experience.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

In various embodiments, technologies are disclosed for using various internal, adjacent, and external data to provide an intelligent scaling algorithm that is more efficient in scaling resources for a cloud service provider and that is responsive to changes in demand. In an embodiment, data from two or more of the following sources may be used to make a scaling decision:

Current demand on the service (for example CPU, memory, or request rate);

Availability of other service instances (for example, loss of connectivity to a service instance in a remote region may correlate to higher load is expected for the service instance in the local region);

Historical trends including factors such as time of day, day of week, holidays, seasons and time zones;

Current usage data for other external services (for example, an unexpected spike in messages or breaking news alerts can predict an imminent spike in demand for a voicemail service).

Referring to the appended drawings, in which like numerals represent like elements throughout the several FIGURES, aspects of various technologies for mitigating misconfiguration issues will be described. In the following detailed description, references are made to the accompanying drawings that form a part hereof, and which are shown by way of illustration specific configurations or examples.

In some embodiments, methods are described for application of machine learning to analyze various parameters to predict workload demand.

Workload demands may sometimes follow indirect factors or seasonal or periodic historical trends due to the nature of applications contained in them. For example, a file server hosting user profiles or virtual desktop infrastructure (VDI) systems may see a large increase in traffic as users begin work at the start of the workday. Once these logins occur, however, the throughput of those VMs dissipate while other applications may not display the same trends. For example, a SQL server (or other application) may have different trends based on the customer's usage.

The cloud provider may not otherwise have inherent awareness of the workload trends across a broad spectrum of parameters. Moreover, workload may be difficult to predict as the applications and trends are customer and environment specific. Accordingly, in some embodiments a machine learning system may be implemented to analyze the various inputs. In one embodiment, a trained machine learning model may be used to forecast workload demands.

Some embodiments may leverage internal parameters that are available on operating systems or at the control plane. This can enable a more efficiently utilized hypervisor and reduce the number of servers needed to satisfy the workloads, administrator troubleshooting, and the like. The machine learning model can be trained to predict upcoming workload demands using these as well as various internal and external data. Based on the analysis, the issue may be auto-remediated by allocating resources, spinning up containers, live migrating VM(s) to another system, and the like. The model can also provide an API which allows other kernel or user mode applications to be informed of potential workload demands and changing resource allocations.

For example, a storage network rebuild is an uncommon act and can greatly reduce the amount of available bandwidth. By predicting upcoming requirements, the rebuild process can be executed at an appropriate pace until system resources are reallocated to account for the rebuild.

In some embodiments, machine learning can be implemented to correlate internal indicators, seasonal/periodic indications, adjacent indications, and external indications, and proactively allocate and migrate resources to reduce resource inefficiency and data loss. Various internal and external events can have widespread adverse effects, for example across clustered nodes. Current implementations to address workload variations can be static in nature. For example, settings for addressing changing workloads can remain static until manual intervention occurs. However, by analyzing the disclosed indicators and predicting workloads, intelligent actions can be initiated (e.g., migrate workloads to another cluster node, allocate resources in advance of the need, migrate workloads back, etc.).

The above-described conditions can occur as a result of inconsistent application network patterns and in public or private cloud scenarios where the administrator does not have the visibility to identify the trends and patterns that indicate workload changes and changes to the demands on applications. In some embodiments disclosed herein, machine learning can be implemented to reduce the inefficient use of system resources. In current systems, an administrator can simply maximize the allocated resources to reduce the likelihood of performance and data loss. However, this would waste system resources during periods of low activity. The use of a learning system can allow for dynamic adaptation to changing customer environments to efficiently utilize system resources as network scenarios change.

In an embodiment, a trained machine learning model can receive multiple variables such as CPU rate, memory rate, request rate, vNIC bytes/per sec, NIC low resource indications, and number of retransmits, and track the usage of the system resources across multiple levels of periodicity (for example: hour-per-day, day-of-week) to identify "hotspots" in the data and forecast future needs. The trained machine learning model can also receive data indicative of an adjacent demand. As used herein, adjacent demand may indicate demand for services or resources that are not directly implemented by network for which a forecast is to be determined but may which have an indirect correlative effect. For example, an increasing number of voice calls in an adjacent system may indicate the imminent need for a voicemail system. The trained machine learning model can also receive data indicative of events that are external to the computing network. Such events may include messages from an external message service may indicate that an increasing number of voice calls may follow.

A forecast can be generated and when a threshold is reached, the system can initiate a proactive mitigation action. The forecast can be in the form of a predictive usage profile. The predictive usage profile may be indicative of future usage of the computing resources in the computing network during a future time interval. The predictive usage profile determined based on the at least two of the first, second, third, or fourth data is usable to adjust allocations of the computing resources in the computing network prior to changes in demand for the computing resources. For example, server allocations resources can be increased or decreased, or if the host has insufficient resources, applications can be migrated between hosts to provide more efficient load balancing. The predictive usage profile may also be referred to as an expected usage profile. The predictive usage profile or expected usage profile may be represented as an array of values distributed over time, a time-based distribution of data, a graph of demand versus time, and the like.

In some embodiments, a trained machine learning model can also receive data that indicates which services have difference tolerance levels for latencies. For example, some services may be able to absorb a temporary increase in workload demand, whereas some latency-sensitive services may be little tolerance for latencies.

In some embodiments, a cost function may be implemented that considers cost factors that may limit the degree to which resources can be scaled up. For example, the amount of headroom for meeting an identified demand may be limited based on availability of resources, contention for resources by other networks or services, and service level agreements. In some embodiments, an operator may provide input as to the amount of cost (i.e., extra allocated resource) to be traded off vs. risk (e.g., adhere more closely to the predicted model and spend less on unused resources, at the risk of being less responsive to worst-case workload increases).

By forecasting workload demands as disclosed herein, host efficiency can be improved, network congestion can be reduced, and the application (e.g., VM, container) can improve performance. The disclosed technologies can enable more accurate utilization, which in turn can enable, for example, more cost-efficient resource management. Technical benefits other than those specifically mentioned herein might also be realized through implementations of the disclosed technologies.

A number of performance counters and other system and network parameters may be used to train the machine learning model. For example, to implement efficient virtual machine placement, the network bytes/sec per virtual NIC (vNIC) network bytes/sec can be tracked and subtracted from the amount that the host is using. The remaining amount is the delta available capacity for that host. By forecasting the needs on that host, if it is determined that there is insufficient capacity to accommodate the forecasted needs, virtual resources can be migrated as needed.

In some embodiments, a host computing device may execute an agent that is configured to track various performance counters for virtual machines, host vNICs, containers, physical NICs, and the like. The agent may send the tracked data to a storage service for storage and analysis.

Additionally, the analysis of the performance data can be performed at various levels of granularity. For example, a machine learning model may analyze data across a cluster of nodes or multiple clusters. A localized machine learning model can be run on a smaller grouping of hosts or a single host so that local variations can be accounted for. For example, some variations may be more pronounced on a local host as compared to the cluster.

Models for forecasting historical variations can have at least two components. A trend component can model the basic trend of a metric over time. A periodic or seasonal component can model predictable changes based on the natural period of the metric (e.g., daily startup). Some models may include a noise component that accounts for expected variations in the data Some models may also include an event-based component that represents effects due to the impact of an asynchronous or anomalous event. The event-based component can be used for various types of sudden events such as a customer reconfiguration or rapid influx of calls.

In an embodiment, a forecasting model for resource allocation may be represented by:

$$TS_t = T_t + S_t + E_t + N_t$$

T may represent the trend component of the model. S may represent the seasonal component. E may represent an event-based component. N may represent the noise component. t may represent the time.

In an example, inputs to the forecasting model may include at least four types of data. First data may be indicative of a current demand for computing resource usage in the computing network. Second data may be indicative of an adjacent demand for computing resource usage in the computing network. The adjacent demand is for services provided by the cloud computing system that are outside of the computing network. The services may have a correlative effect on the resource usage in the computing network. Third data may be indicative of a historical demand for computing resource usage in the computing network. The historical demand may comprise a time-based usage profile for the computing resources in the computing network during a previous selected time interval. The time-based usage profile may have a trend component and a periodic component. Fourth data may be indicative of events that are external to the cloud computing system.

Figure 1:
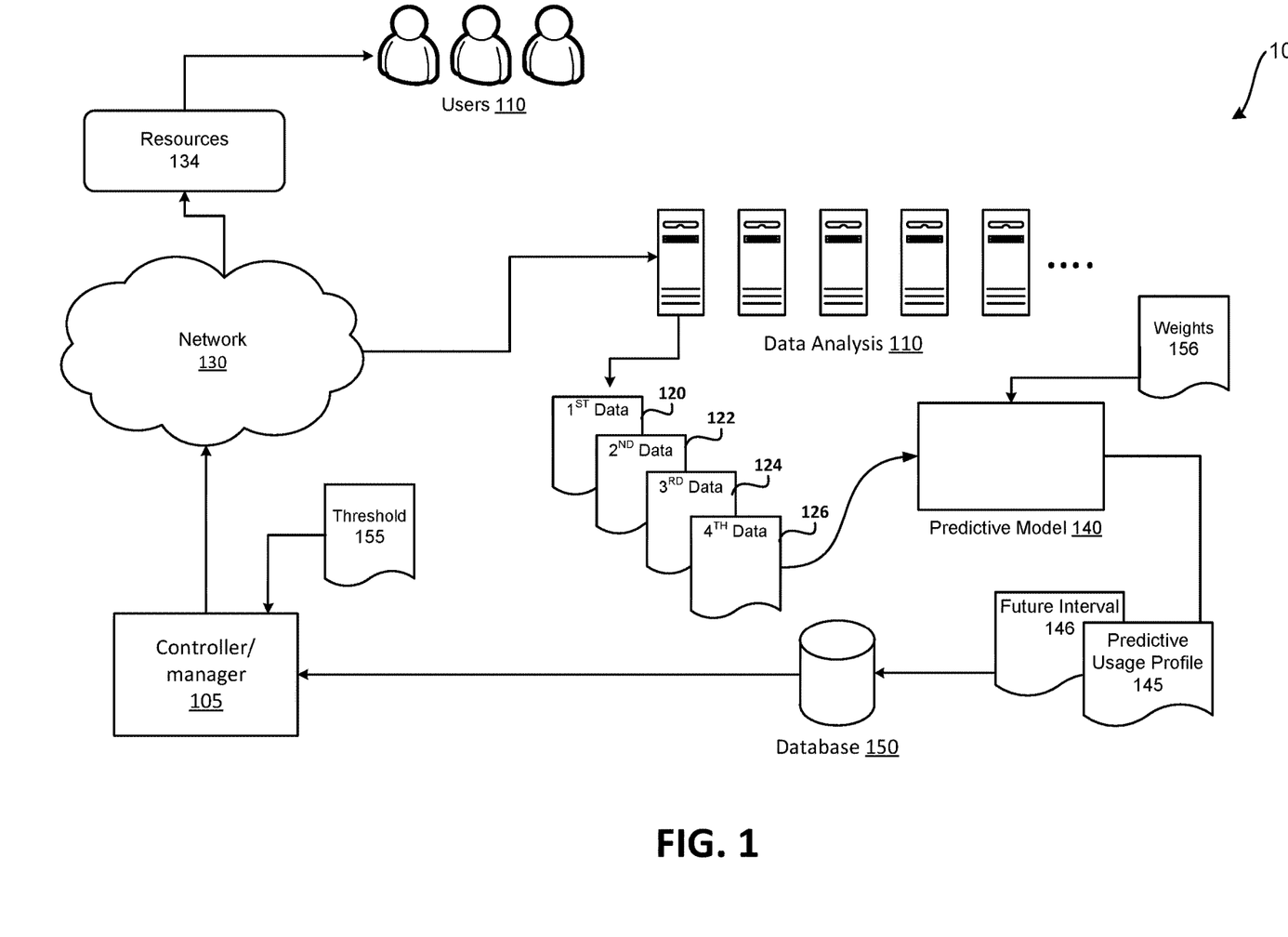
FIG. 1 is a diagram illustrating a system for forecasting system workloads in accordance with the present disclosure.

In an example, at least two of the first, second, third, or fourth data may be input to the forecasting model. Input weights may be adjusted based on feedback to the model. In one example, first data indicative of a current demand for computing resource usage in the computing network may be used, such as request rate, and second data indicative of an adjacent demand for computing resource usage in the computing network such as an increasing number of voice calls in an adjacent system may be used to determine a predictive usage profile. In another example, first data indicative of a current demand for computing resource usage in the computing network may be used, such as request rate, second data indicative of an adjacent demand for computing resource usage in the computing network such as an increasing number of voice calls in an adjacent system, and third data indicative of a historical demand for computing resource usage in the computing network such as historical increase in computing usage as users begin work at the start of the workday may be used to determine a predictive usage profile. In another example, first data indicative of a current demand for computing resource usage in the computing network may be used, such as request rate, second data indicative of an adjacent demand for computing resource usage in the computing network such as an increasing number of voice calls in an adjacent system, third data indicative of a historical demand for computing resource usage in the computing network such as historical increase in computing usage as users begin work at the start of the workday, and fourth data indicative of events that are external to the cloud computing system such as an increase in messages in a messaging service, may be used to determine a predictive usage profile FIG. 1 illustrates an example computing system architecture diagram showing an overview of a system disclosed herein for a predictive modeling system, according to one embodiment disclosed herein. As shown in FIG. 1, a modeling system 100 (which might also be referred to herein as a "forecasting system" or as a "prediction system") may be configured to model system parameters based upon various event data ("event data") generated by data analysis components 110 (which might be referred to individually as an "data analysis component 110" or collectively as the "data analysis components 110").

The data analysis components 110 may, for example, include, but are not limited to, physical computing devices such as server computers or other types of hosts, associated hardware components (e.g., memory and mass storage devices), and networking components (e.g., routers, switches, and cables). The data analysis components 110 can also include software, such as operating systems, applications, and containers, network services, virtual components, such as virtual disks, virtual networks, and virtual machines. The database 150 can include data, such as a database, or a database shard (i.e., a partition of a database). The modeling system 100 may be used to predict a metric that may be used to update system parameters. In some configurations, a predictive model 140 may be implemented. The predictive model 140 may also be referred to as a learning model 140 or a machine learning model 140 or forecasting model 140. As shown in FIG. 1, the predictive model 140 can generate predictions (which might be referred to herein simply as a "prediction") based on data extracted from monitored information. The predictions may include a predictive usage profile 145 for a future interval 146. The predictive usage profile 145 may be acted upon by controller/manager 105 that may be configured to tune settings for network devices or cause one or more virtual machines to be migrated or one or more servers to be allocated, for example. The actions may be taken based on a performance threshold 155 which may be determined by comparing the predictive usage profile 145 to current resource allocations. The performance threshold 155 may, for example, be a maximum difference D between a current capability based on current allocations (e.g., X requests/second can be processed) and a predicted demand (Y requests/second will be needed). The performance threshold 155 can be determined by the cloud service provider or determined dynamically as the allocations of the computing network change over time.

In an embodiment, the data analysis components 110 may provide various types of data to the predictive model 140. In one embodiment, the data may include first data 120 indicative of a current demand for computing resource usage in the computing network. The data may include second data 122 indicative of an adjacent demand for computing resource usage in the computing network. In an embodiment, the adjacent demand is for services provided by the cloud computing system that are outside of the computing network. For example, the adjacent demand may pertain to another instance of the same system (e.g., a remote instance of a voicemail system is having an outage). In another example, the adjacent demand may pertain to a different external system (e.g., demand at an external phone system which is adjacent to the voicemail system). The services may have a correlative effect on the resource usage in the computing network.

The data may include third data 124 indicative of a historical demand for computing resource usage in the computing network. In an embodiment, the historical demand comprises a time-based usage profile for the computing resources in the computing network during a previous selected time interval. The time-based usage profile may have a trend component and a periodic component. The data may include fourth data 126 indicative of events that are external to the computing network. The weights 156 for the inputs to the predictive model 140 may be adjusted based on continuous feedback as forecasts are generated, network conditions change, and as new inputs are received.

In some embodiments, additional sets of data may be used for the prediction. Such additional sets may include, for example, data indicative of planned maintenance at a remote site ahead of time and the amount of resources that will be unavailable during the planned maintenance.

Figure 2:
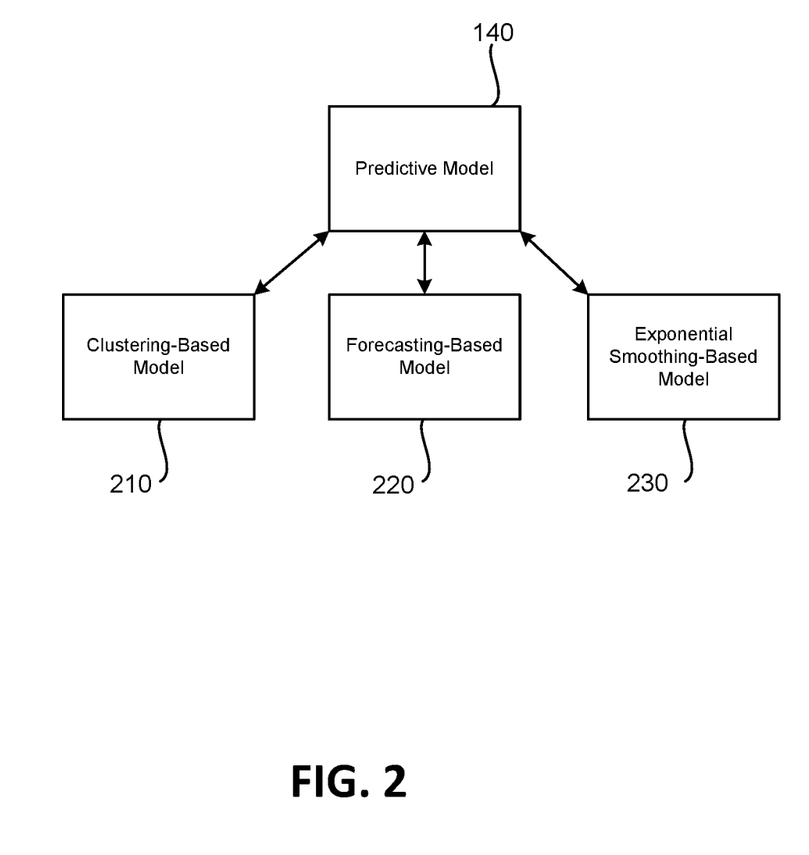
FIG. 2 is a diagram illustrating machine learning models in accordance with the present disclosure.

As shown in FIG. 2, the machine learning model or predictive model 140 may also, or alternately, utilize unsupervised machine learning techniques to predict resources including, but not limited to, a clustering-based model 310, a forecasting-based model 320, a smoothing-based model 330, or another type of unsupervised machine learning model.

In some embodiments, the data may be analyzed to identify trends and patterns related to various system parameters and external data and determine which parameters and data may influence resource utilization. In one embodiment, the machine learning model 140 may incorporate a classification function that may be configured to determine which parameters are relevant for a particular objective. The classification function may, for example, continuously learn which parameters are relevant to a various potential outcomes. In some embodiments, supervised learning may be incorporated where the machine learning model may classify observations made from various parameters.

Figure 3:
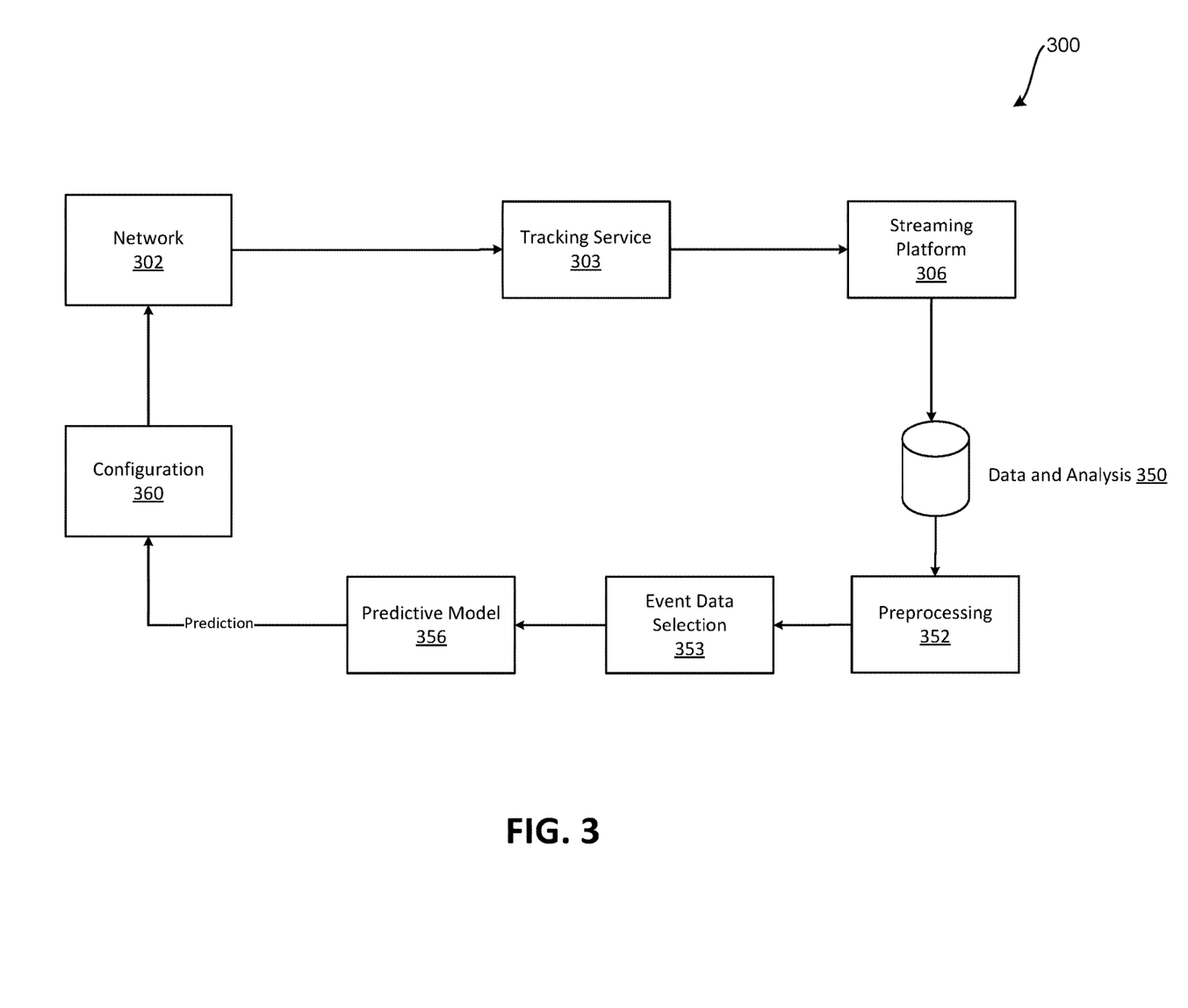
FIG. 3 is a diagram illustrating a system for forecasting system workloads in accordance with the present disclosure.

FIG. 3 is a computing system architecture diagram showing an overview of a system disclosed herein for predictive scaling of resources, according to one embodiment. As shown in FIG. 3, predictive scaling system 300 may be configured to predict workload changes based upon tracking data generated by tracking service 303 and received from network 302.

The tracking service 303 may send selected tracking data to a streaming platform 306. Data streams may be provided to a data storage component and analysis component 350. The data and analysis component 350 may provide data for a preprocessing component 352 that may be configured to process the stored data. The processed data may be provided to an event data selection component 353 that may be configured to select event data and properties. The processed data may be provided to predictive model 356 that may use the data and properties to update the model based on the event data, generate a prediction, and send the prediction to configuration system 360. Configuration system 360 may cause the updating of one or more system configurations such as a server allocation or migration of virtual machines in network 302.

Figure 4:
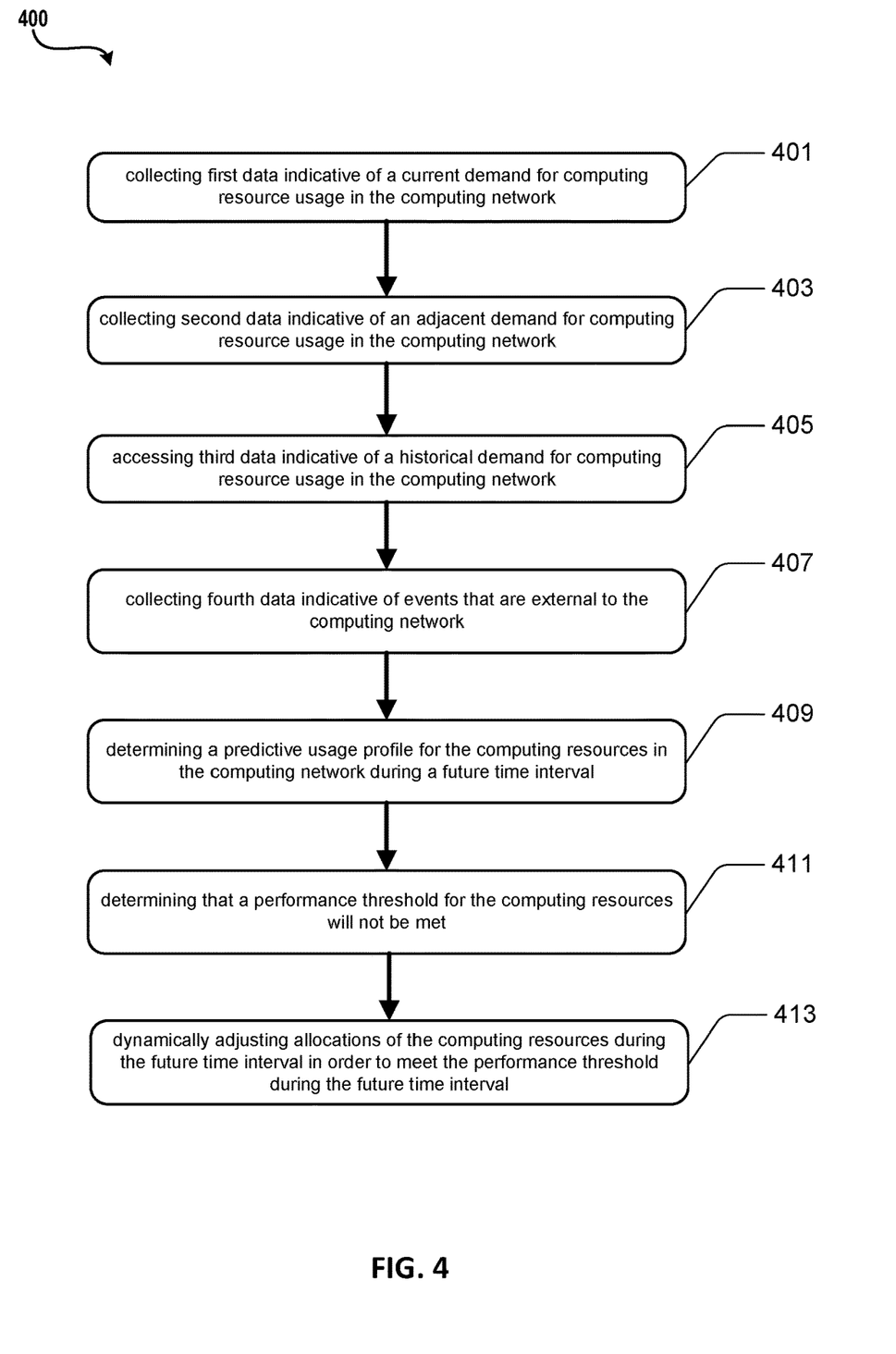
FIG. 4 is a flowchart depicting an example procedure in accordance with the present disclosure.

Turning now to FIG. 4, illustrated is an example operational procedure for allocating computing resources in a computing network of a cloud computing system in accordance with the present disclosure. In an embodiment, the computing resources comprises a plurality of computing devices hosting virtual machines, containers, and other instances.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 4, operation 401 illustrates collecting first data indicative of a current demand for computing resource usage in the computing network.

Operation 401 may be followed by operation 403. Operation 403 illustrates collecting second data indicative of an adjacent demand for computing resource usage in the computing network. In an embodiment, the adjacent demand is for services provided by the cloud computing system that are outside of the computing network. In an embodiment, the services have a correlative effect on the resource usage in the computing network.

Operation 403 may be followed by operation 405. Operation 405 illustrates accessing third data indicative of a historical demand for computing resource usage in the computing network. In an embodiment, the historical demand comprises a time-based usage profile for the computing resources in the computing network during a previous selected time interval. In an embodiment, the time-based usage profile has a trend component and a periodic component.

Operation 405 may be followed by operation 407. Operation 407 illustrates collecting fourth data indicative of events that are external to the computing network.

Operation 407 may be followed by operation 409. Operation 409 illustrates based on at least two of the first data indicative of a current demand for computing resource usage in the computing network, the second data indicative of an adjacent demand for computing resource usage in the computing network, the third data indicative of a historical demand for computing resource usage in the computing network, or the fourth data indicative of events that are external to the cloud computing system, determining a predictive usage profile indicative of future usage of the computing resources in the computing network during a future time interval. In an embodiment, the predictive usage profile determined based on the at least two of the first, second, third, or fourth data is usable to adjust allocations of the computing resources in the computing network prior to changes in demand for the computing resources.

Operation 409 may be followed by operation 411. Operation 411 illustrates based on the predictive usage profile, determining that a performance threshold for the computing resources will not be met.

Operation 411 may be followed by operation 413. Operation 413 illustrates in response to determining that the performance threshold for the computing resources will not be met, dynamically adjusting allocations of the computing resources during the future time interval in order to meet the performance threshold during the future time interval.

Figure 5:
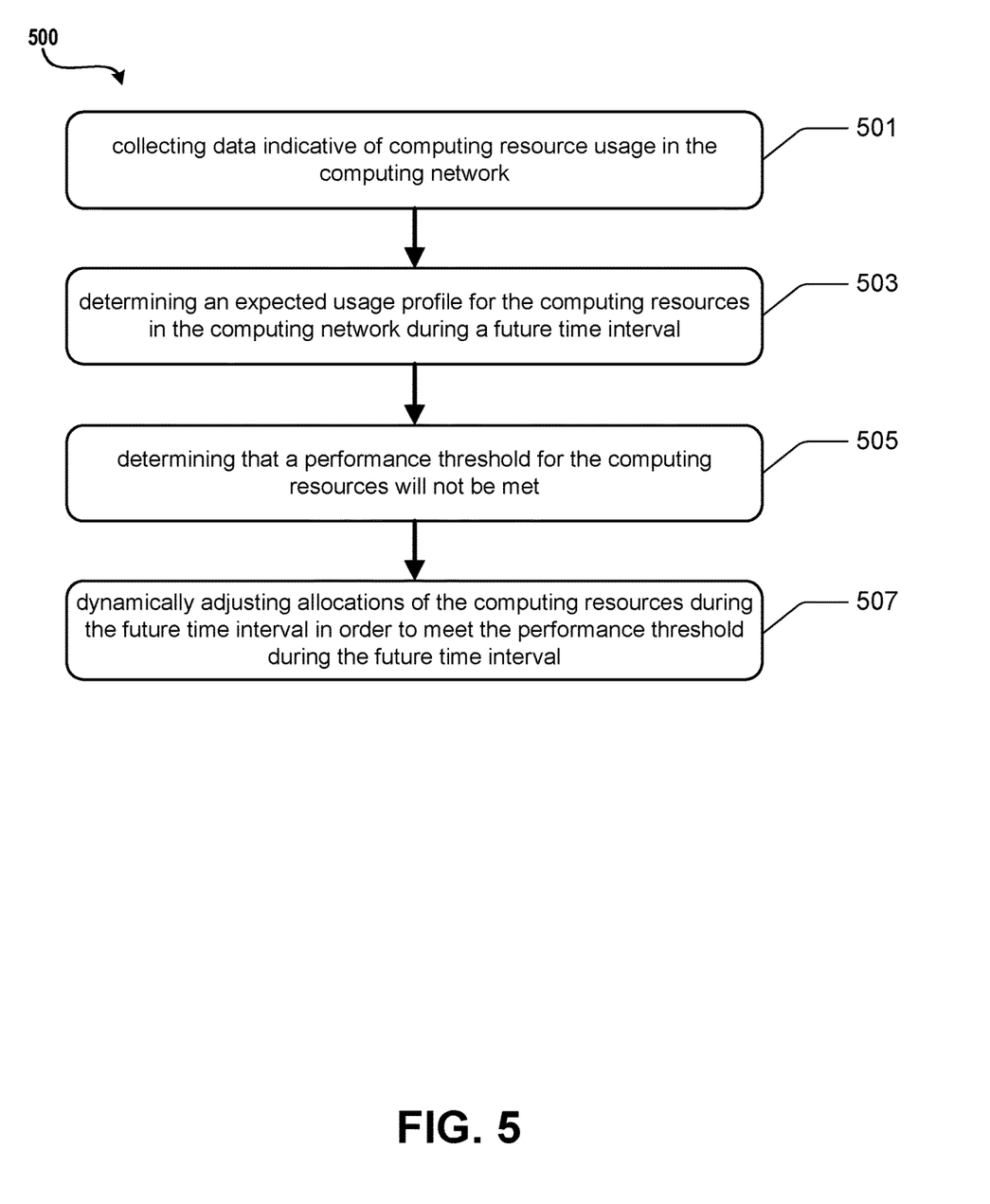
FIG. 5 is a flowchart depicting an example procedure in accordance with the present disclosure.

Referring to FIG. 5, illustrated is an example operational procedure for allocating computing resources in a computing network of a cloud computing system, the computing resources comprising a plurality of computing devices hosting virtual machines. Referring to FIG. 5, operation 501 illustrates collecting data indicative of computing resource usage in the computing network.

Operation 501 may be followed by operation 503. Operation 503 illustrates based on the collected data, determining an expected usage profile for the computing resources in the computing network during a future time interval.

Operation 503 may be followed by operation 505. Operation 505 illustrates based on the expected usage profile, determining that a performance threshold for the computing resources will not be met.

Operation 505 may be followed by operation 507. Operation 507 illustrates in response to determining that the performance threshold for the computing resources will not be met, dynamically adjusting allocations of the computing resources during the future time interval in order to meet the performance threshold during the future time interval.

Figure 6:
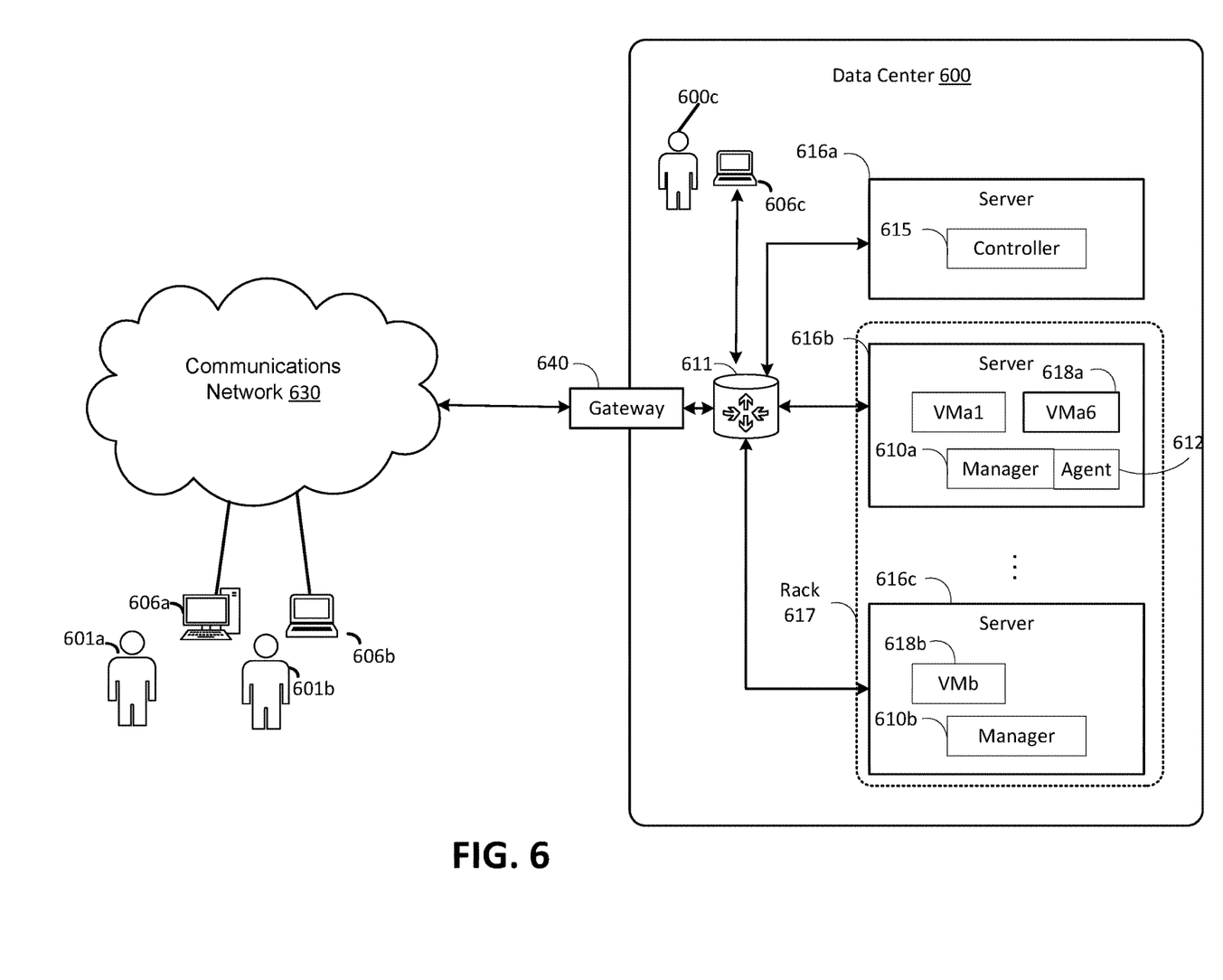
FIG. 6 is a diagram illustrating a data center for providing virtualized resources in accordance with the present disclosure.

FIG. 6 illustrates an example computing environment in which the embodiments described herein may be implemented. FIG. 6 illustrates a data center 600 that configured to provide computing resources to users 601a, 601b, or 601c (which may be referred herein singularly as "a user 601" or in the plural as "the users 601") via user computers 606a, 606b, and 606c (which may be referred herein singularly as "a computer 606" or in the plural as "the computers 606") via a communications network 630. The computing resources provided by the data center 600 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 600 may include servers 616a, 616b, and 616c (which may be referred to herein singularly as "a server 616" or in the plural as "the servers 616") that provide computing resources available as virtual machines 618a and 618b (which may be referred to herein singularly as "a virtual machine 618" or in the plural as "the virtual machines 618"). The virtual machines 618 may be configured to execute applications such as Web servers, application servers, media servers, database servers, and the like. Other resources that may be provided include data storage resources (not shown on FIG. 6) and may include file storage devices, block storage devices, and the like. Servers 616 may also execute functions that manage and control allocation of resources in the data center, such as a controller 615. Controller 615 may be a fabric controller or another type of program configured to manage the allocation of virtual machines on servers 616.

Referring to FIG. 6, communications network 630 may, for example, be a publicly accessible network of linked networks and may be operated by various entities, such as the Internet. In other embodiments, communications network 630 may be a private network, such as a corporate network that is wholly or partially inaccessible to the public.

Communications network 630 may provide access to computers 606. Computers 606 may be computers utilized by users 600. Computer 606a, 606b or 606c may be a server, a desktop or laptop personal computer, a tablet computer, a smartphone, a set-top box, or any other computing device capable of accessing data center 600. User computer 606a or 606b may connect directly to the Internet (e.g., via a cable modem). User computer 606c may be internal to the data center 600 and may connect directly to the resources in the data center 600 via internal networks. Although only three user computers 606a, 606b, and 606c are depicted, it should be appreciated that there may be multiple user computers.

Computers 606 may also be utilized to configure aspects of the computing resources provided by data center 600. For example, data center 600 may provide a Web interface through which aspects of its operation may be configured through the use of a Web browser application program executing on user computer 606. Alternatively, a stand-alone application program executing on user computer 606 may be used to access an application programming interface (API) exposed by data center 600 for performing the configuration operations.

Servers 616 may be configured to provide the computing resources described above. One or more of the servers 616 may be configured to execute a manager 160a or 160b (which may be referred herein singularly as "a manager 160" or in the plural as "the managers 160") configured to execute the virtual machines. The managers 160 may be a virtual machine monitor (virtual machine), fabric controller, or another type of program configured to enable the execution of virtual machines 618 on servers 616, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 600 shown in FIG. 6, a router 611 may be utilized to interconnect the servers 616a and 616b. Router 611 may also be connected to gateway 640, which is connected to communications network 630. Router 611 may manage communications within networks in data center 600, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 600 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 7:
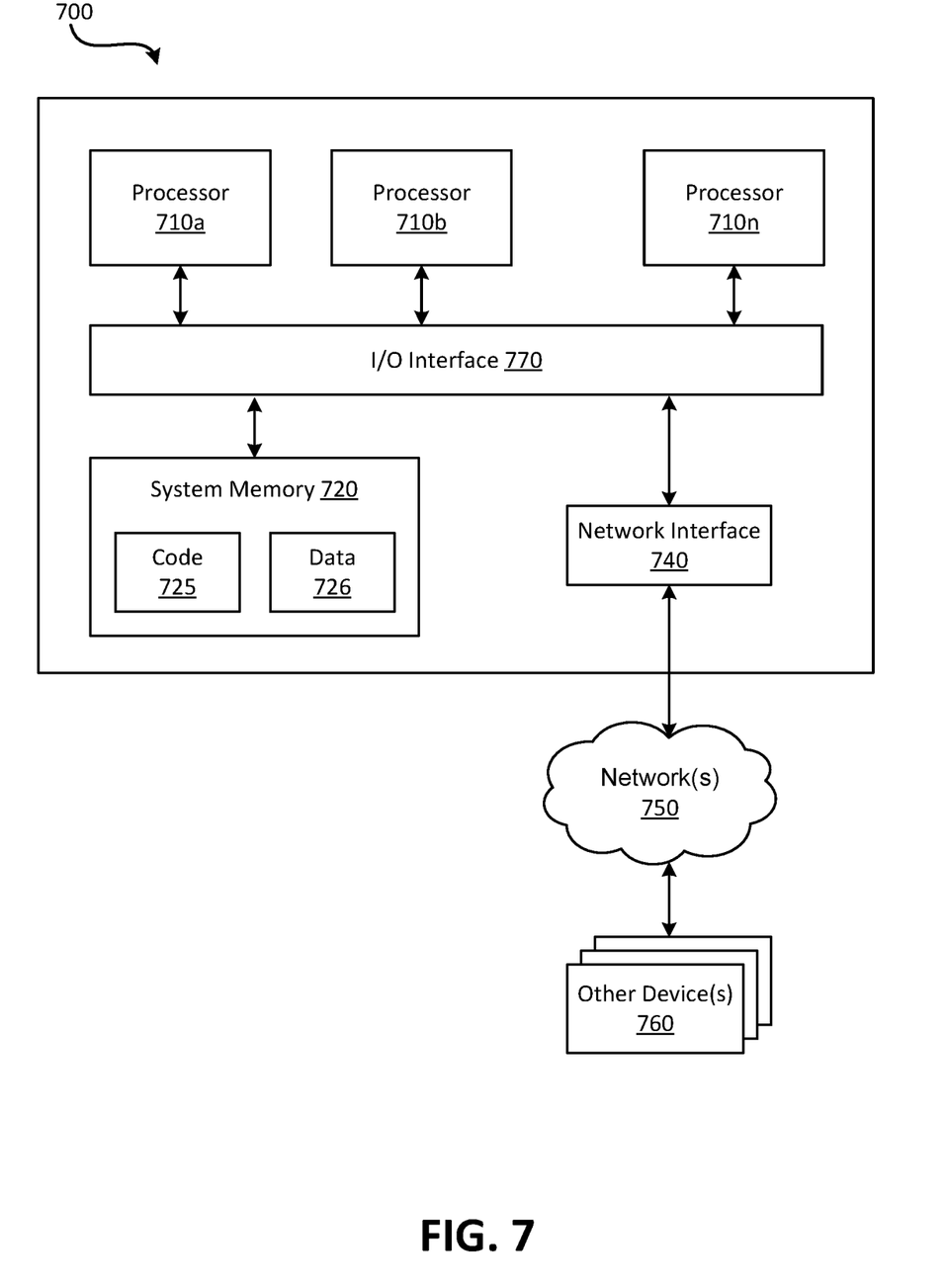
FIG. 7 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 7 illustrates such a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 770. Computing device 700 further includes a network interface 740 coupled to I/O interface 770.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x76, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 770 may be configured to coordinate I/O traffic between the processor 710, system memory 720, and any peripheral devices in the device, including network interface 740 or other peripheral interfaces. In some embodiments, I/O interface 770 may perform any necessary protocol, timing, or other data transformations to convert data signals from one component (e.g., system memory 720) into a format suitable for use by another component (e.g., processor 710). In some embodiments, I/O interface 770 may include support for devices attached through various types of peripheral buses, such as a variant of the Peripheral Component Interconnect (PCI) bus standard or the Universal Serial Bus (USB) standard, for example. In some embodiments, the function of I/O interface 770 may be split into two or more separate components. Also, in some embodiments some or all of the functionality of I/O interface 770, such as an interface to system memory 720, may be incorporated directly into processor 710.

Network interface 740 may be configured to allow data to be exchanged between computing device 700 and other device or devices 760 attached to a network or network(s) 750, such as other computer systems or devices as illustrated in FIGS. 1 through 4, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 720 may be one embodiment of a computer-accessible medium configured to store program instructions and data as described above for FIGS. 1-6 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 770. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A computer-implemented method for allocating computing resources in a computing network of a cloud computing system, the computing resources comprising a plurality of computing devices hosting virtual machines or containers, the method comprising:

collecting first data indicative of a current demand for computing resource usage in the computing network;

collecting second data indicative of an adjacent demand for computing resource usage in the computing network, wherein the adjacent demand is for services provided by the cloud computing system that are outside of the computing network, the services having a correlative effect on the resource usage in the computing network;

accessing third data indicative of a historical demand for computing resource usage in the computing network, wherein the historical demand comprises a time-based usage profile for the computing resources in the computing network during a previous selected time interval, the time-based usage profile having a trend component and a periodic component;

collecting fourth data indicative of events that are external to the cloud computing system;

based on at least two of the first data indicative of a current demand for computing resource usage in the computing network, the second data indicative of an adjacent demand for computing resource usage in the computing network, the third data indicative of a historical demand for computing resource usage in the computing network, or the fourth data indicative of events that are external to the cloud computing system, determining a predictive usage profile indicative of future usage of the computing resources in the computing network during a future time interval, wherein the predictive usage profile determined based on the at least two of the first, second, third, or fourth data is usable to adjust allocations of the computing resources in the computing network prior to changes in demand for the computing resources;

based on the predictive usage profile for the computing resources in the computing network during a future time interval, determining that a performance threshold for the computing resources during the future time interval will not be met; and in response to determining that the performance threshold for the computing resources in the computing network during the future time interval will not be met, dynamically adjusting allocations of the computing resources during the future time interval in order to meet the performance threshold for the computing resources during the future time interval.

Clause 2: The method of clause 1, wherein the expected usage profile is further generated based on a system-wide model and a localized model.

Clause 3: The method of any of clauses 1-2, wherein the first data comprises CPU rate, memory rate, or request rate.

Clause 4: The method of any of clauses 1-3, wherein the second data comprises availability of virtual machines in other networks of the cloud computing system.

Clause 5: The method of any of clauses 1-4, wherein the third data comprises historical trends based on time of day, day of week, holidays, seasons, and time zones.

Clause 6: The method of any of clauses 1-5, wherein the fourth data comprises spikes in messages sent by messaging systems or breaking news alerts.

Clause 7: The method of clauses 1-6, further comprising generating a notification when determining that the performance threshold for the computing resources will not be met.

Clause 8: The method of any of clauses 1-7, wherein the expected usage profile is identified using a machine learning model.

Clause 9: A system, comprising:
one or more processors; and
a memory in communication with the one or more processors, the memory having computer-readable instructions stored thereupon that, when executed by the one or more processors, cause the system to perform operations comprising:
collecting first data indicative of a current demand for computing resource usage in a computing network of a cloud computing system, the computing resource usage for computing resources comprising a plurality of computing devices hosting virtual machines;
collecting second data indicative of an adjacent demand for computing resource usage in the computing network, wherein the adjacent demand is for services provided by the cloud computing system that are outside of the computing network, the services having a correlative effect on the resource usage in the computing network;
accessing third data indicative of a historical demand for computing resource usage in the computing network, wherein the historical demand comprises a time-based usage profile for the computing resources in the computing network during a previous selected time interval, the time-based usage profile having a trend component and a periodic component;
collecting fourth data indicative of events that are external to the computing network;
based on at least two of the first, second, third, or fourth data, determining a predictive usage profile for the computing resources in the computing network during a future time interval;
based on the predictive usage profile, determining that a performance threshold for the computing resources will not be met; and
in response to determining that the performance threshold for the computing resources will not be met, dynamically adjusting allocations of the computing resources during the future time interval in order to meet the performance threshold during the future time interval.

Clause 10: The system of clause 9, wherein the allocations of the computing resources dynamically are adjusted based on tolerances for meeting the performance threshold during the future time interval.

Clause 11: The system of any of clauses 9 and 10, wherein the allocations of the computing resources dynamically are adjusted based on a cost function for meeting the performance threshold during the future time interval.

Clause 12: The system of any clauses 9-11, wherein the expected usage profile is identified using a machine learning model.

Clause 13: The system of any clauses 9-12, wherein the allocations of the computing resources dynamically are adjusted based on a machine learning model.

Clause 14: A computer-readable storage medium having computer-executable instructions stored thereupon which, when executed by one or more processors of a computing device, cause the computing device to:
collecting first data indicative of a current demand for computing resource usage in a computing network of a cloud computing system, the computing resource usage for computing resources comprising a plurality of computing devices hosting virtual machines;
collecting second data indicative of an adjacent demand for computing resource usage in the computing network, wherein the adjacent demand is for services provided by the cloud computing system that are outside of the computing network, the services having a correlative effect on the resource usage in the computing network;
accessing third data indicative of a historical demand for computing resource usage in the computing network, wherein the historical demand comprises a time-based usage profile for the computing resources in the computing network during a previous selected time interval, the time-based usage profile having a trend component and a periodic component;
collecting fourth data indicative of events that are external to the computing network;
based on at least two of the first, second, third, or fourth data, determining an expected usage profile for the computing resources in the computing network during a future time interval;
based on the expected usage profile, determining that a performance threshold for the computing resources will not be met; and
in response to determining that the performance threshold for the computing resources will not be met, dynamically adjusting allocations of the computing resources during the future time interval in order to meet the performance threshold during the future time interval.

Clause 15: The computer-readable storage medium of clause 14, wherein the first data comprises CPU rate, memory rate, or request rate.

Clause 16: The computer-readable storage medium of any of clauses 14 and 15, wherein the second data comprises availability of virtual machines in other networks of the cloud computing system.

Clause 17: The computer-readable storage medium of any of the clauses 14-16, wherein the third data comprises historical trends based on time of day, day of week, holidays, seasons, and time.

Clause 18: The computer-readable storage medium of any of the clauses 14-17, wherein the fourth data comprises spikes in messages sent by messaging systems or breaking news alerts.

Clause 19: The computer-readable storage medium of any of the clauses 14-18, wherein the expected usage profile is identified using a machine learning model.

Clause 20: The computer-readable storage medium of any of the clauses 14-19, wherein the allocations of the computing resources dynamically are adjusted based on tolerances for meeting the performance threshold during the future time interval.

What is claimed is:

1. A computer-implemented method for allocating computing resources in a computing network of a cloud computing system, the computing resources comprising a plurality of computing devices hosting virtual machines or containers, the method comprising:
    collecting first data indicative of a current demand for computing resource usage in the computing network;
    collecting second data indicative of an adjacent demand for computing resource usage in the computing network, wherein the adjacent demand is for services provided by the cloud computing system that are not implemented by the computing network, the services having an indirect correlative effect on the resource usage in the computing network; wherein the second data comprises availability of virtual machines in other networks of the cloud computing system;
    accessing third data indicative of a historical demand for computing resource usage in the computing network, wherein the historical demand comprises a time-based usage profile for the computing resources in the computing network during a previous selected time interval, the time- based usage profile having a trend component and a periodic component;
    collecting fourth data indicative of events that are external to the cloud computing system;
    based on at least two of the first data indicative of a current demand for computing resource usage in the computing network, the second data indicative of an adjacent demand for computing resource usage in the computing network, the third data indicative of a historical demand for computing resource usage in the computing network, or the fourth data indicative of events that are external to the cloud computing system, computing determining a predictive usage profile indicative of future usage of the computing resources in the computing network during a future time interval, wherein the predictive usage profile determined based on the at least two of the first, second, third, or fourth data is usable to adjust allocations of the computing resources in the computing network prior to changes in demand for the computing resources; wherein the predictive usage profile is identified using a machine learning model;
    based on the predictive usage profile for the computing resources in the computing network during a future time interval, determining that a performance threshold for the computing resources during the future time interval will not be met; and
    in response to determining that the performance threshold for the computing resources in the computing network during the future time interval will not be met, dynamically adjusting, by a controller function of the computing network, allocations of the computing resources during the future time interval in order to meet the performance threshold for the computing resources during the future time interval.

2. The method of claim 1, wherein the predictive usage profile is further generated based on a system-wide model and a localized model.

3. The method of claim 1, wherein the first data comprises CPU rate, memory rate, or request rate.

4. The method of claim 1, wherein the third data comprises historical trends based on time of day, day of week, holidays, seasons, and time zones.

5. The method of claim 1, wherein the fourth data comprises spikes in messages sent by messaging systems or breaking news alerts.

6. The method of claim 1, further comprising generating a notification when determining that the performance threshold for the computing resources will not be met.

7. A system, comprising:
    one or more processors; and
    a memory in communication with the one or more processors, the memory having computer-readable instructions stored thereupon that, when executed by the one or more processors, cause the system to perform operations comprising:
    collecting first data indicative of a current demand for computing resource usage in a computing network of a cloud computing system, the computing resource usage for computing resources comprising a plurality of computing devices hosting virtual machines;
    collecting second data indicative of an adjacent demand for computing resource usage in the computing network, wherein the adjacent demand is for services provided by the cloud computing system that are not implemented by the computing network, the services having an indirect correlative effect on the resource usage in the computing network; wherein the second data comprises availability of virtual machines in other networks of the cloud computing system;
    accessing third data indicative of a historical demand for computing resource usage in the computing network, wherein the historical demand comprises a time-based usage profile for the computing resources in the computing network during a previous selected time interval, the time-based usage profile having a trend component and a periodic component;
    collecting fourth data indicative of events that are external to the computing network;
    based on at least two of the first, second, third, or fourth data, computing a predictive usage profile for the computing resources in the computing network during a future time interval;
    wherein the predictive usage profile is identified using a machine learning model;
    based on the predictive usage profile, determining that a performance threshold for the computing resources will not be met; and in response to determining that the performance threshold for the computing resources will not be met, dynamically adjusting allocations of the computing resources during the future time interval in order to meet the performance threshold during the future time interval.

8. The system of claim 7, wherein the allocations of the computing resources dynamically are adjusted based on tolerances for meeting the performance threshold during the future time interval.

9. The system of claim 7, wherein the allocations of the computing resources dynamically are adjusted based on a cost function for meeting the performance threshold during the future time interval.

10. A non-transitory computer-readable storage medium having computer-executable instructions stored thereupon which, when executed by one or more processors of a computing device, cause the computing device to perform operations comprising:
    collecting first data indicative of a current demand for computing resource usage in a computing network of a cloud computing system, the computing resource usage for computing resources comprising a plurality of computing devices hosting virtual machines;
    collecting second data indicative of an adjacent demand for computing resource usage in the computing network, wherein the adjacent demand is for services provided by the cloud computing system that are not implemented by the computing network, the services having an indirect correlative effect on the resource usage in the computing network; wherein the second data comprises availability of virtual machines in other networks of the cloud computing system;
    accessing third data indicative of a historical demand for computing resource usage in the computing network, wherein the historical demand comprises a time-based usage profile for the computing resources in the computing network during a previous selected time interval, the time-based usage profile having a trend component and a periodic component;
    collecting fourth data indicative of events that are external to the computing network;
    based on at least two of the first, second, third, or fourth data, computing an expected usage profile for the computing resources in the computing network during a future time interval;
    wherein the expected usage profile is identified using a machine learning model;
    based on the expected usage profile, determining that a performance threshold for the computing resources will not be met; and
    in response to determining that the performance threshold for the computing resources will not be met, dynamically adjusting allocations of the computing resources during the future time interval in order to meet the performance threshold during the future time interval.

11. The non-transitory computer-readable storage medium of claim 10, wherein the first data comprises CPU rate, memory rate, or request rate.

12. The non-transitory computer-readable storage medium of claim 10, wherein the third data comprises historical trends based on time of day, day of week, holidays, seasons, and time.

13. The non-transitory computer-readable storage medium of claim 10, wherein the fourth data comprises spikes in messages sent by messaging systems or breaking news alerts.

14. The non-transitory computer-readable storage medium of claim 10, wherein the allocations of the computing resources dynamically are adjusted based on tolerances for meeting the performance threshold during the future time interval.

* * * * *